United States Patent [19]

Park

[11] 4,232,740
[45] Nov. 11, 1980

[54] HIGH TEMPERATURE STABLE SAND CONTROL METHOD

[75] Inventor: Jack H. Park, Houston, Tex.

[73] Assignee: Texaco Development Corp., White Plains, N.Y.

[21] Appl. No.: 41,835

[22] Filed: May 23, 1979

[51] Int. Cl.$^2$ .................... E21B 33/134; E21B 43/04; E21B 43/24

[52] U.S. Cl. .................... 166/276; 166/288; 166/292; 166/300; 166/303

[58] Field of Search ............... 166/272, 276, 288, 292, 166/300, 303

[56] References Cited

U.S. PATENT DOCUMENTS

| | | | |
|---|---|---|---|
| 2,955,653 | 10/1960 | Cain | 166/292 X |
| 3,055,423 | 9/1962 | Parker | 166/288 X |
| 3,103,973 | 9/1963 | Mullen | 166/288 |
| 3,175,611 | 3/1965 | Hower | 166/292 |
| 3,741,308 | 6/1973 | Veley | 166/288 X |
| 3,756,315 | 9/1973 | Suman, Jr. et al. | 166/276 |
| 4,024,917 | 5/1977 | Martin | 166/292 |

*Primary Examiner*—Stephen J. Novosad
*Assistant Examiner*—George A. Suchfield
*Attorney, Agent, or Firm*—Carl G. Ries; Jack H. Park; Robert A. Kulason

[57] ABSTRACT

This invention relates to a method for treating wells completed in subterranean formations to form a mechanically stable, permeable mass which permits flow of fluids therethrough into or from the well, while restricting the movement of unconsolidated earth formation particles such as sand into the well. This method is especially suitable for treating producing wells in a subterranean formation being subjected to thermal oil recovery stimulation of viscous oil production such as by steam flooding, which causes rapid deterioration of consolidated sand or gravel masses formed with plastic resins. The method comprises contacting sand with an aqueous solution of calcium hydroxide, plus an effective amount of calcium salt having solubility greater than calcium hydroxide, such as calcium chloride, plus an alkalinity agent such as sodium hydroxide.

32 Claims, No Drawings

HIGH TEMPERATURE STABLE SAND CONTROL METHOD

FIELD OF THE INVENTION

This invention pertains to a method for treating wells penetrating and completed in subterranean earth formations, to form a permeable, mechanically competent barrier which restrains the flow of particulate matter such as sand while permitting the flow of fluids such as petroleum from the formation into a production well.

BACKGROUND OF THE INVENTION

Recovery of fluid such as gas and or oil from a subterranean formation is frequently troublesome when the subterranean formation is composed of one or more incompetent sand layers or zones. Sand particles in the incompetent or unconsolidated sand zone migrate into the well bore during recovery of formation fluids from the zone or zones immediately adjacent to the unconsolidated sand-containing zones. Similar problems are encountered when injecting fluids into formations during the course of secondary or tertiary recovery operations being applied to subterranean formations. The most troublesome problem is encountered while recovering fluids from the formation, in which instance the movement of sand particles into the well bore cause the well to "sand up" and as a consequence thereof, further production of fluids from the well is made difficult or impossible. Small sand particles can also plug small openings in porous masses formed around the well bore for the purpose of restraining the flow or particulate matter such as sand or gravel into the well, resulting in terminating further production of fluid from that particular well. Another adverse results of sand particle migration into the producing well is the rapid wear of the tubular goods or mechanical equipment when the abrasive sand particles are transported to the surface along with the fluids being produced, and brought into contact with pipes, pumps, and other surface equipment being used to recover and transport formation fluids.

Many methods are described in the prior art for preventing or decreasing the flow of undesirable particulate matter such as sand during the course of recovering formation fluids from production wells. These include the placement of mechanical screens, filters, perforated or slotted lines, etc., around the production tubing present in the well bore. While these devices have been of limited success in some instances, they are not always entirely satisfactory for a number of reasons. The mechanical devices restrain only the larger sand particles and are not completely effective for restraining the flow of very fine sand particles from the formation into the well and then to the surface of the earth. Many of these devices interfer with completion and work over operations.

Chemical compositions for forming permeable barriers around the well bore have been described in the literature and used in the field with success in some instances. Resinous plastic materials are injected into a mass of unconsolidated sand, either naturally occurring formation sand or sand which has been placed in a cavity created adjacent to the well bore for that purpose, the resinous plastic material bonding the sand particles together. Numerous difficulties are encountered during commercial applications of this technique, but even when the permeable mass can be formed satisfactorily, it is not effective and satisfactory for use in producing wells producing viscous petroleum, the production of which is being stimulated by thermal recovery means such as by injection of steam into the formation. The consolidated sand masses are rapidly degraded by passage of high temperature, sometimes alkaline steam through the sand restraining barriers.

In view of the foregoing discussion, it can be appreciated that there is a substantial, unfulfilled need for a sand control method capable of preventing the flow of unconsolidated mineral particles including sand into or away from the well bore during a period of fluid injection. More particularly, there is a need for an inexpensive, reliable method of controlling the flow of sand into or away from the well in a formation which is sufficiently resistant to hot, alkaline fluids to permit its use in formations being stimulated by injection of high temperature alkaline fluids such as steam and caustic.

By the method of the present invention one is able to treat underground formations so as to accomplish consolidation of granular materials such as sand or gravel into a permeable, competent and consolidated mass, which effectively restrains the movement of unconsolidated sand particles into or away from the well bore, which consolidated permeable mass will not be appreciably affected by subsequent contact with hot alkaline fluid such as steam or a mixture of steam and an alkalinity agent such as caustic, thus avoiding many of the disadvantages of prior art methods, both mechanical and chemical.

PRIOR ART

U.S. Pat. No. 3,974,877 issued Aug. 17, 1976, describes a sand consolidation method which forms a high temperature stable permeable mass by low temperature oxidation of high asphaltene-containing crude oil.

U.S. Pat. No. 3,741,308 issued June 26, 1973, describes a method for consolidating sand formations in a manner which forms a temperature-stable cement bond between the unconsolidated sand grains, by injecting solutions saturated with calcium hydroxide into the pore spaces of the unconsolidated sand formation. Many cycles of calcium hydroxide fluid injection must be applied because of the limited solubility of the calcium hydroxide, in order to accomplish sufficient cementing between the sand grains.

SUMMARY OF THE INVENTION

My invention relates to a process by means of which a solid mass with appreciable mechanical strength and sufficient permeability to permit flow of fluids therethough may be formed in a portion of the formation adjacent to a well bore penetrating the subterranean earth formation. The permeable mass restrains the undesireable flow of particulate formation material such as sand into a production well during oil recovery from the well. The method comprises introducing an aqueous solution saturated with calcium hydroxide or lime, and which fluid also contains from 0.1 to 10.0 percent by weight of a calcium salt whose solubility is appreciably greater than the solubility of calcium hydroxide. The preferred soluble calcium salt is calcium chloride. The fluid also contains from 0.1 to 10.0 percent by weight of an alkalinity agent which also has a solubility appreciably greater than the solubility of calcium hydroxide. The preferred alkalinity agent is caustic or sodium hydroxide. As lime is removed from the solution by the cementing reaction, calcium chloride and sodium hydroxide react to form additional lime, thereby maintaining the necessary concentration of calcium hydroxide in the aqueous fluid to accomplish the desired cementing reaction between the sand grains, which ultimately accomplishes consolidation of the unconsolidated sand to form the sand-restraining barrier. The sand grains which are cemented together by this reaction may be naturally-occurring sand grains in the formation, but in one embodiment a cavity is formed by washing or mechanical reaming, and the cavity is filled with clean sand of a preferred size range, and then the cementing solution is injected into the unconsolidated sand and allowed to remain for a sufficient period of time to cement the sand grains together.

DESCRIPTION OF THE PREFERRED EMBODIMENTS

Briefly, the process of my invention involves contacting unconsolidated aggregates such as sand or gravel with an aqueous solution which is saturated with calcium hydroxide, and also contains from 0.1 to 10.0 and preferably from 1.0 to 5.0 percent by weight of calcium chloride or other calcium salt having solubility in water greater than the solubility of calcium hydroxide, and further contains from 0.1 to 10.0 and preferably from 1.0 to 5.0 percent by weight of an alkalinity agent, preferably sodium hydroxide, said alkalinity agent having solubility in water considerably greater than the solubility of calcium hydroxide. Other soluble calcium salts which may be employed are calcium acetate, calcium ferrocyanide, calcium formate, calcium isobutyrate, calcium ethylmethyl acetate, calcium nitrate, calcium propionate, calcium thiocyanate, and mixtures thereof. Other alkalinity agents are potassium hydroxide, lithium hydroxide and ammonium hydroxide. As calcium hydroxide is removed from the solution as the result of the cementing reaction, the more soluble salt, e.g., calcium chloride and the alkalinity agent, e.g., sodium hydroxide react to form additional calcium hydroxide, thereby maintaining the concentration of calcium hydroxide dissolved in the treating liquid at a level sufficient to maintain the cementing reaction.

The degree of improvement in the cementing reaction is surprisingly greater than one would expect from maintaining the calcium and hydroxyl levels constant. Apparently the presence of the more soluble calcium salt and or the alkalinity agent accelerates the cementing reaction considerably.

The sand grains which are cemented together may be sand which is naturally occurring in the formation being treated. In another embodiment, the well is enlarged in the zone where the sand-restraining barrier is to be formed, and sand of a preferred particle size and size range is introduced into the formation, and then the treating fluid is injected thereto to cement the sand grains together.

If it is determined that the sand naturally present in the formation is relatively clean, i.e., free of oil and other contaminating materials on the surface of the sand grains, and is of a suitable particle size, it is satisfactory to simply inject the treating liquid into this naturally-occurring sand mass and allow the fluid to remain present in the formation for a period of time sufficient to cause reaction between the calcium hydroxide and the sand grains. If the particle size of the formation sand is satisfactory, as will be discussed below, but not completely clean, a preferred embodiment comprises pretreating the formation sand to remove any oil coating on the sand grains or other contaminant such as clay or silt. This is accomplished by injecting from fifty to five hundred gallons per foot of formation being treated, of an aqueous surfactant-containing fluid, preferably a hot, aqueous surfactant fluid. For example, injecting water containing from 1.0 to 10.0 percent by weight of a water soluble petroleum sulfonate heated to a temperature from 125° F. to 200° F. followed by injecting water, preferably hot water, to displace the hot surfactant fluid into the formation, effectively cleans the sand.

If the sand in the formation where the sand consolidation process is to be applied is not suitable, for a variety of reasons, it is preferred to enlarge the diameter of the well bore in the portion of the formation immediately adjacent to the zone where consolidation process is to be applied. It is generally satisfactory if this enlargement extends from two to twenty feet beyond the normal radius of the well bore. This can be accomplished by numerous commercially available mechanical reaming devices, or in unconsolidated formations it is conveniently accomplished by locating an injection string near the bottom of the zone where the enlargement is desired and circulating water or other suitable fluids therethrough for a period of several hours, in order to wash out a portion of the unconsolidated formation, thereby enlarging the well bore to the desired two to twenty feet radius.

The sand to be introduced into the cavity created as described above is preferably sand which is closely sized within a broad range of from 10 to 80 mesh, i.e., from 10 to 20 mesh, 20 to 40 mesh, or 40 to 80 mesh, in order to permit the formation of an effective, relatively high permeability barrier being formed. If sand having a very broad range of particle sizes is used, e.g., the full range of 10 to 80 mesh, the fine grain sand particles tend to occupy the pore spaces between the adjacent, cemented sand grains resulting in the formation of a dense, non-porous mass which restrains flow of sand but does not permit the flow of fluids therethrough. Accordingly, optimum results are achieved if the largest particle size utilized is no more than approximately twice the smallest sand particles size utilized. Frac sand, commonly used in petroleum formation fracturing operations and widely available in oil field areas, has a size range from 20 to 40 mesh and it is an especially preferred sand for use in this process. Sand particles which are substantially coarser than 10 mesh or finer than 80 mesh are not suitable for use in this application as sand whose particles are within the 10 to 80 mesh range. If sand particles which are coarser than 10 mesh are used, the sand restraining barrier is formed with pore sizes so great that fine sand particles from the formation can move freely through the sand restraining mass. Very fine sand particles, i.e., those less than 80 mesh, are unsuitable because the resulting permeable barrier has insufficient permeability to permit the flow of formation fluids therethrough, even if the ratio of largest to smallest sand particles is within the prescribed two to one limits.

The reaction time required for this process is in the range from about 1 to 24 and preferably from 4 to 16 hours. The time required to accomplish effective cementing between sand grains varies somewhat with formation temperature, the reaction time being less at higher formation temperatures. If the formation temperature is substantially below about 100° F., it is preferable that a heated fluid such as steam or hot air be injected into the zone to be treated prior to the injection of the treating liquid, in order to raise the temperature to a value which ensures the rapid cementing of sand grains after injection of the treating liquid.

Even with the greatly increased cementing capacity of the liquid provided by the liquid described herein, the amount of calcium hydroxide present initially and which is generated during the course of the cementing reaction may not be sufficient to completely cement the sand grains together in a single application. Accordingly, it may be necessary to inject a fresh supply of the treating liquid periodically, i.e., every 1 to 24 and preferably 4 to 16 hours, in order to accomplish complete cementing of the sand grains together. It is generally satisfactory if the fluid contacting the sand grains to be cemented together is replaced from 2 to 20 and preferably from 4 to 10 times.

In a slightly different, especially preferred embodiment of the present invention, another treatment is applied between each injection of treating liquid into the sand grains. This is equally suitable for use in embodiments where naturally-occurring sand is being treated, as well as those in which a cavity is formed and clean sand of the optimum, preferred particle size and size range is packed into the cavity. This process involves injecting an inert, noncondensible gas into the sand pack, sufficient to completely displace the liquid out of the pore spaces after it has remained in the sand pack for a sufficient period of time to accomplish reaction between the calcium hydroxide present and generated in the liquid and the sand grains, and before fresh treating liquid is injected into the sand. This accomplishes two benefits. First, the spent liquid is completely eliminated, thereby reducing the dilution effect between the spent treating liquid and the freshly injected liquid. This assures that in each succeeding injection, optimum calcium hydroxide concentration is brought into contact with the sand grains to maximize the cementing action. Second, displacement of the liquid and any accumulated precipitate, silt, or other fine particle materials from the pore spaces ensures the maintenance of the required porosity and permeability in the sand being consolidated, and results in a superior sand restraining, fluid-permeable barrier. Suitable gases for use in this embodiment include air, natural gas, carbon dioxide, as well as any other readily available gas. Injection should be at a pressure sufficient to cause movement of gas into and liquid out of the sand mass being treated, although high injection rates are not desirable. Injection should be continued for a sufficient period of time to ensure that substantially all of the liquid has been displaced from the pore spaces of the mass which generally requires only from 2 to 20 and preferably from 4 to 10 hours of gas injection.

In yet another, slightly different embodiment of my invention, the soluble calcium salt and caustic are injected separately in a plurality of small slugs, in a repetitive, alternating fashion to cause mixing of the calcium and caustic in situ, in the sand pack. The total volume of treating solution is about the same as is used in the above described embodiments, but is divided into at least six and preferably at least twelve separate slugs. A small slug, e.g., from five to fifty and preferably from ten to forty gallons of water containing from 0.1 to 10.0 percent of a soluble calcium salt such as calcium chloride is injected, followed immediately by a similar size slug of water containing from 0.1 to 10.0 percent by weight of the alkalinity agent, e.g., sodium hydroxide, followed by another slug of calcium and then another slug of alkalinity agent, etc., until all of the slugs had been injected. The slugs mix and react in the sand pack, forming calcium hydroxide which cements the sand grains together.

The process of my invention can be better understood by reference to the following pilot field example which is offered for purpose of complete disclosure of a preferred mode of operating and is not intended to be in any way limitative or restrictive thereof.

FIELD EXAMPLE

A tar sand deposit approximately 75 feet thick is located under an overburden layer of 350 feet. An exploitation is planned using steam and caustic drive process. This process required the establishment of a communication zone by fracturing and subsequent treatment to enlarge the fracture into a stable communication path, followed by injecting a mixture of 85 percent quality saturated steam and approximately 1 percent caustic soda into the communication path. In order to stabilize the well bore of the injection well, and especially to prevent sanding up of the production well, it is desired to apply sand control treatments to both the injection well and the production well.

It is determined that the sand in the portion of the formation where the sand control barrier is desired is unsuitable for use in forming the barrier for several reasons. The particle size of the sand is much too fine and the particle size range too great. Furthermore, the sand is contaminated with clay and viscous petroleum coating which is tenaciously adhering to the sand grains. Accordingly, to is desired to form a cavity adjacent to the injection well and production well in order to provide space for forming the sand barrier. An injection string is inserted into the well and position so that the bottom of the string is approximately adjacent to the bottom of the interval to be treated. Steam is injected into the well for approximately 12 hours to raise the temperature thereof sufficiently to cause flow of petroleum, after which hot water containing one percent caustic is injected into the string to flow past the surface of the zone to be treated and back up to the surface of the earth. The hot wter emulsifies the viscous petroleum present in the tar sand and carries both the emulsified bitumen from the tar sand and sand suspended therein to the surface of the earth. After approximately two hours of this treatment, a cavity extending an average of four feet into the tar sand from the center of the well is created, which is sufficient for this process.

A slurry is formulated by suspended 20-40 mesh frac sand in water and this slurry is pumped down the tubing. The injection rate is maintained at a level which ensures the slurry is being pumped into the cavity, but not so excessive that large amounts of the sand-water slurry is returned to the surface of the earth. Sand filters out of the slurry against the formation face, and as a consequence of this forms a pack of essentially clean frac sand against the formation face. As injection pressure rises, indicating the occurance of sand in the bottom of the well, the tubing is raised during the course of forming the sand pack, in order to obtain uniform packing of the sand against the formation face, completely filling the cavity.

Air is injected slowly into the tubing to displace fluid from the well bore initially, and then to force water remaining from the slurry out of the pack and into the formation. The injection pressure is maintained at the minimum level which will cause approximately 200 standard cubic feet per hour to be pumped into the injection string. This is continued for six hours, to thoroughly remove water from the pore spaces of the sand pack, and to accomplish some drying of the sand pack. The air temperature is increased by approximately 200° during the last three hours, in order to raise the temperature of the sand mass, to increase the rate of the cementing reaction.

Air injection is terminated and 30 barrels of a liqid solution comprising field brine having added thereto approximately one percent by weight calcium hydroxide or lime, plus approximately five percent by weight calcium chloride and five percent by weight sodium hydroxide is formulated and injected into the sand mass. This fluid is allowed to remain in the sand mass for 24 hours, during which time the first stage of cementing of the sand grains together is accomplished. Hot air is again injected into the tubing to displace the spent liquid out of the pore spaces of the sand mass, and also to reheat the sand prior to injection of the next treatment of the treating liquid. Hot air is injected for four hours, after which another quantity of approximately 30 barrels of liquid treating solution, identical to that described above, is injected to resaturate the sand pack. This fluid is again left in the sand pack for 24 hours, after which it is displaced out of the sand pack by injecting hot air for four hours, and another 30 barrel quantity of treating liquid is injected to resaturate the sand pack. After the third quantity of treating liquid has remained in the pack for 24 hours, the well it put on production to determine whether sufficient cementing has occurred to prevent flow of sand into the well bore. Only a small amount of sand flows back into the well during a 24 hour test, which indicates that the cementing reaction is nearly complete. Hot air injection is again applied to the sand pack for four hours, and a fourth 30 barrel slug of treating liquid, identical to the previous slugs, is injected and allowed to remain in the sand mass for 24 hours. This fluid is then displaced by injecting air, and it is determined that a stable sand control barrier has been formed adjacent to the well. Both the injection well and production well are treated in identical fashion, prior to initiating injection of steam and caustic for the steam emulsification drive viscous oil recovery process.

While my invention has been described in terms of a number of illustrative embodiments, it is not so limited since many variations thereof will be apparent to persons skilled in the related art without departing from the true spirit and scope of my invention. Similarly, while mechanisms have been discussed in connection with describing the benefits resulting from application of my invention, it is not necessarily my intention to be bound by any particular theory or explanation. It is my desire and intention that my invention be restricted only by those limitations and restrictions appearing in the claims appended immediately hereinafter below.

I claim:

1. A method for treating a subterranean, petroleum-containing formation which contains unconsolidated sand, said formation being penetrated by at least one well in fluid communication with the subterranean formation, for the purpose of forming a permeable solid barrier which restrains the movement of particulate solid matter including sand while permitting passage of fluid including petroleum therethrough, comprising:
   a. introducing a predetermined quantity of treating liquid comprising water which is saturated with calcium hydroxide, and additionally contains an effective amount of calcium salt having solubility greater than the solubility of calcium hydroxide, and an alkalinity agent having solubility greater than the solubility of calcium hydroxide, into the sand present in the formation;
   b. allowing the treating liquid to remain in the sand mass for a predetermined period;
   c. injecting a second quantity of treating liquid into the sand mass to displace the spent treating liquid therefrom; and
   d. allowing the second quantity of liquid to remain in the formation for a predetermined period of time to cause cementing between the sand grains, thereby forming a permeable, competent, sand restraining barrier in the well.

2. A method as recited in claim 1 wherein the calcium salt having solubility greater than the solubility of calcium hydroxide is calcium chloride, calcium acetate, calciumm ferrocyanide, calcium formate, calcium isobutyrate, calcium ethylmethyl acetate, calcium nitrate, calcium propionate, calcium thiocyanate, or mixtures thereof.

3. A method as recited in claim 2 wherein the soluble calcium salt is calcium chloride.

4. A method as recited in claim 1 wherein the concentration of calcium salt having solubility greater than the solubility of calcium hydroxide is from 0.1 to 10.0 percent by weight.

5. A method as recited in claim 1 wherein the concentration of calcium salt having solubility greater than the solubility of calcium hydroxide is from 1.0 to 5.0.

6. A method as recited in claim 1 wherein the alkalinity agent is sodium hydroxide, lithium hydroxide, ammonium hydroxide, potassium hydroxide, or a mixture thereof.

7. A method as recited in claim 6 wherein the alkalinity agent is sodium hydroxide.

8. A method as recited in claim 1 wherein the concentration of the alkalinity agent is from 0.1 to 10.0.

9. A method as recited in claim 1 wherein the concentration of the alkalinity agent is from 1.0 to 5.0.

10. A method as recited in claim 1 comprising the additional step of injecting a surfactant-containing aqueous fluid into the formation prior to injecting the treating liquid, to remove oil from the said grains.

11. A method as recited in claim 10 wherein the fluid contains from 1.0 to 10.0 percent by weight of a water soluble petroleum sulfonate.

12. A method as recited in claim 10 comprising the additional step of heating the surfactant fluid to a temperature from 125° F. to 200° F. prior to injecting it into the formation.

13. A method as recited in claim 1 comprising the additional step of injecting an inert, non condensible gas into the formation after injecting each slug of treating liquid.

14. A method as recited in claim 13 wherein the gas is air, methane, natural gas, carbon dioxide, and mixtures thereof.

15. A method as recited in claim 1 comprising the additional step of injecting a heated fluid into the formation prior to injecting the treating liquid.

16. A method as recited in claim 1 wherein the steps of injecting the treating liquid and allowing it to remain in the formation for a predetermined period is repeated from 2 to 20 times.

17. A method as recited in claim 16 wherein the steps of injecting the liquid and allowing it to remain are repeated from 4 to 10 times.

18. A method as recited in claim 1 wherein the treating liquid is allowed to remain in the portion of the formation adjacent to the well for a period of from 1 to 24 hours.

19. A method as recited in claim 1 wherein the treating liquid is allowed to remain in the portion of the formation adjacent to the well for a time period of from 4 to 16 hours.

20. A method as recited in claim 1 wherein the concentration of calcium salt having solubility greater than the solubility of calcium hydroxide is from 0.1 to 10.0.

21. A method as recited in claim 1 wherein the concentration of the alkalinity agent is from 1.0 to 5.0.

22. A method of forming a permeable, mechanically stable sand restraining barrier in a formation penetrated by at least one
   a. enlarging the well bore to form a cavity adjacent to the original well bore;
   b. introducing a predetermined quantity of granular material of predetermined particle size and size range into the well bore;
   c. introducing a treating liquid comprising water which is saturated with calcium hydroxide and additionally contains a predetermined quantity of a calcium salt having solubility greater than the solubility of calcium hydroxide and a predetermined quantity of an alkalinity agent;
   d. allowing the treating liquid to remain in the sand pack for a predetermined period of time sufficient to cement the sand grains together; and
   e. repeating steps c to d at least once.

23. A method as recited in claim 22 wherein the granular material introduced into the cavity has a mesh size within the range of from 10 to 80, with the particle size of the largest particles being no more than twice the particle size of the smallest particles.

24. A method as recited in claim 22 wherein the mesh size of the particulate matter introduced into the cavity is from 20 to 40.

25. A method as recited in claim 22 wherein the salt having solubility greater than the solubility of calcium hydroxide is calcium chloride, calcium acetate, calcium ferrocyanide, calcium formate, calcium isobutyrate, calcium ethylmethyl acetate, calcium nitrate, calcium propionate, calcium thiocyanate, and mixtures thereof.

26. A method as recited in claim 25 wherein the soluble calcium salt is calcium chloride.

27. A method as recited in claim 20 wherein the concentration of calcium salt having solubility greater than the solubility of calcium hydroxide is from 1.0 to 5.0.

28. A method as recited in claim 20 wherein the alkalinity agent is sodium hydroxide, lithium hydroxide, ammonium hydroxide, potassium hydroxide, or a mixture thereof.

29. A method as recited in claim 28 wherein the alkalinity agent is sodium hydroxide.

30. A method as recited in claim 22 wherein the concentration of the alkalinity agent is from 0.1 to 10.0

31. A method as recited in claim 22 comprising the additional step of injecting a non condensible gas into the formation after each step of injecting the treating liquid into the sand pack to displace spent treating liquid from the pore spaces of the sand pack.

32. A method as recited in claim 22 comprising the additional step of injecting a hot fluid into the sand pack to heat the sand prior to injecting the treating liquid.

* * * * *